United States Patent [19]

Le

[11] Patent Number: 5,963,723
[45] Date of Patent: Oct. 5, 1999

[54] SYSTEM FOR PAIRING DEPENDENT INSTRUCTIONS HAVING NON-CONTIGUOUS ADDRESSES DURING DISPATCH

[75] Inventor: Hung Qui Le, Austin, Tex.

[73] Assignee: International Business Machines Corporation, Armonk, N.Y.

[21] Appl. No.: 08/827,076

[22] Filed: Mar. 26, 1997

[51] Int. Cl.⁶ .................................................. G06F 9/38
[52] U.S. Cl. ..................................... 395/391; 395/800.23
[58] Field of Search ................................... 395/390, 391, 395/389, 800.23

[56] References Cited

U.S. PATENT DOCUMENTS

| | | | |
|---|---|---|---|
| 4,594,655 | 6/1986 | Hao et al. ................................ | 395/394 |
| 5,051,940 | 9/1991 | Vassiliadis et al. ................. | 364/736.04 |
| 5,163,139 | 11/1992 | Haigh et al. ............................. | 395/391 |
| 5,295,249 | 3/1994 | Blaner et al. ........................... | 395/390 |
| 5,337,415 | 8/1994 | DeLano et al. ......................... | 395/391 |
| 5,349,692 | 9/1994 | Nishi ...................................... | 395/390 |
| 5,426,743 | 6/1995 | Phillips et al. .......................... | 395/564 |
| 5,613,080 | 3/1997 | Ray et al. ............................... | 395/390 |
| 5,669,011 | 9/1997 | Alpert et al. ............................ | 395/390 |

*Primary Examiner*—Richard L. Ellis
*Attorney, Agent, or Firm*—Kelly K. Kordzik; Winstead Sechrest & Minick P.C.; Anthony V. S. England

[57] ABSTRACT

In a superscalar data processing system, instructions, which are dependent upon each other, are paired for dispatch to a plurality of execution units. Pairing results in instructions being paired that may not necessarily be located at contiguous addresses. Pairing may be performed by comparing general purpose register source pointers and general purpose register target pointers of the various instructions. Pairing may also be accomplished by comparing target identification numbers of source operands with target identification numbers of target instructions.

41 Claims, 9 Drawing Sheets

SYSTEM FOR PAIRING DEPENDENT INSTRUCTIONS HAVING NON-CONTIGUOUS ADDRESSES DURING DISPATCH

CROSS-REFERENCE TO RELATED APPLICATIONS

This patent application is related to U.S. patent application Ser. No. 08/761,875, filed Dec. 9, 1996, titled INSTRUCTION DISPATCH UNIT AND METHOD FOR DYNAMICALLY CLASSIFYING AND ISSUING INSTRUCTIONS OUT OF ORDER, which is assigned to the assignee of this application and is hereby incorporated herein by reference.

TECHNICAL FIELD

The present invention relates in general to data processing systems, and in particular, to the dynamic pairing of dependent instructions in a processor.

BACKGROUND INFORMATION

Superscalar microprocessor designs allow for the dispatching of multiple instructions in parallel to various execution units. However, many instructions are dependent upon receiving results from other instructions. Such dependent instructions may not reside adjacent each other within the instruction flow. Prior art designs that provide for the dispatching of adjacent pairs of instructions are inadequate to dispatch dependent instructions that are not adjacent to each other within the instruction flow. Therefore, there is a need in the art for a system and process for selecting instructions to be paired together, which is not limited to selecting adjacent instructions in a queue.

SUMMARY OF THE INVENTION

The present invention addresses the foregoing need by providing a system and method for dynamically pairing instructions that may or may not be located in contiguous address locations.

The present invention may implement one or more parallel processes for pairing such instructions. Within a group of instructions to be dispatched from an instruction queue to a pre-execution queue, the present invention compares general purpose register ("GPR") source pointers of newer instructions with GPR target pointers of older instructions. If there is a match, the youngest target instruction is paired with the oldest dependent instruction. As the target instruction is in-gated into the pre-execution queue, its DPTR field is set to point to the pre-execution queue location that the dependent instruction is in-gated into.

A parallel process that may be implemented is the comparing of GPR source pointers of instructions currently being dispatched from the instruction queue to the pre-execution queue with GPR target pointers of instructions already located within the pre-execution queue. If there is a match, the oldest dependent instruction being dispatched is paired with the youngest target instruction within the pre-execution queue. If the dependent instruction is not paired with any dispatch instruction, then as the dependent instruction is in-gated into the pre-execution queue, its location within the pre-execution queue is saved in the DPTR field of the target instruction. This may be implemented to avoid a cycle inhibiting process of accessing the GPR to obtain the TID, do the comparison, and then calculate the DPTR.

Yet another parallel process which may be implemented within the present invention is a comparing of the TID of a source operand of dispatched instructions against the target TID of instructions in the pre-execution queue.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention is described with respect to an implementation that supports the Fixed Point Unit of the Power PC architecture (Power PC is a trademark of International Business Machines Corp.). The same scheme can be adapted to support other execution units as well as other architectures.

Figure 1:
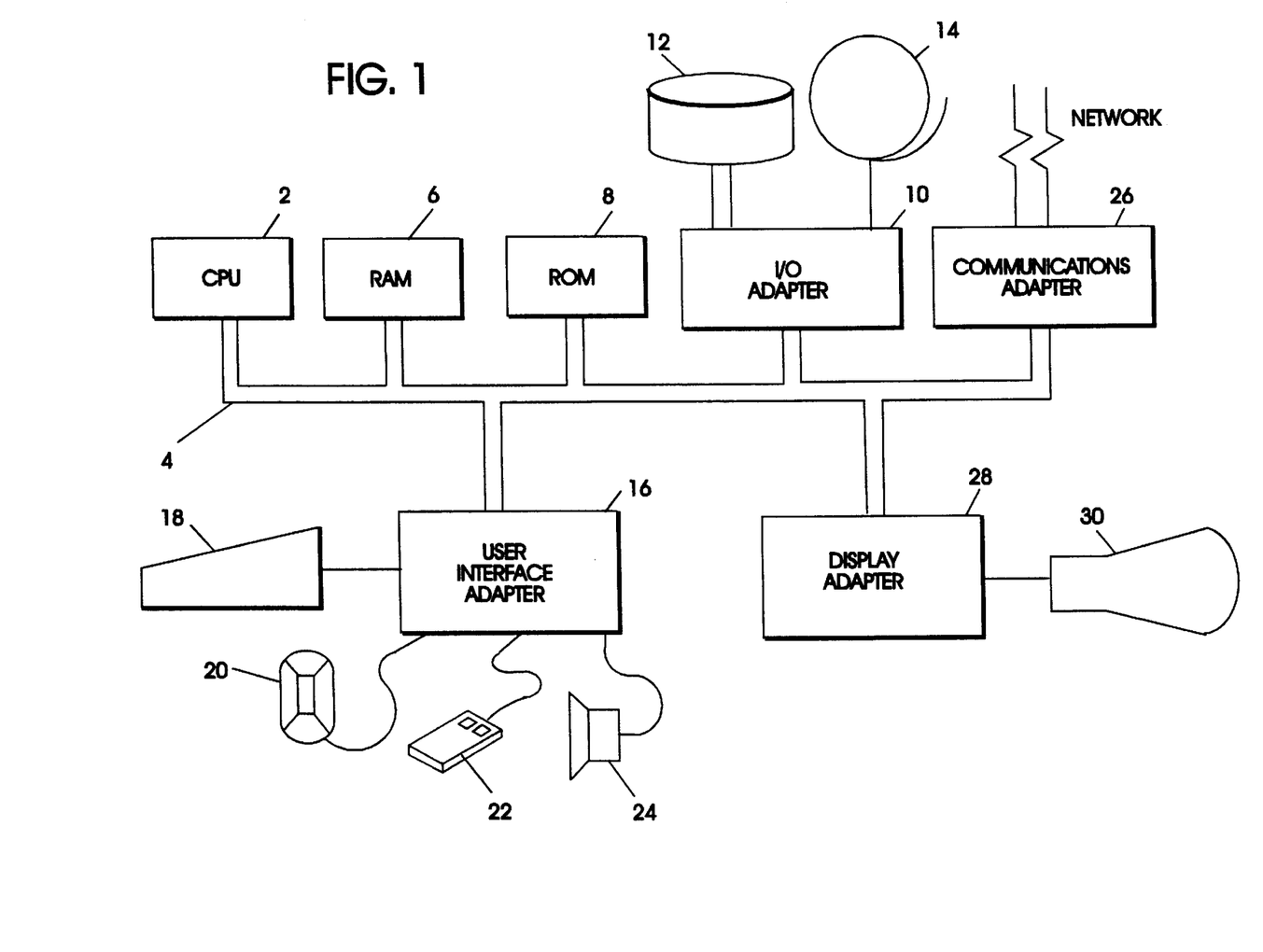
FIG. 1 is a block diagram of an information handling system embodying the present invention.

A typical information handling system is depicted in FIG. 1 and includes at least one central processing unit (CPU) 2. CPU 2 is interconnected via system bus 4 to random access memory (RAM) 6, read only memory (ROM) 8, and input/output (I/O) adapter 10 for connecting peripheral devices such as disc units 12 and tape drives 14 to bus 4, user interface adapter 16 for connecting keyboard 18, mouse 22, speaker 24, microphone 20, and/or other user interface devices such as a touch screen device (not shown) to bus 4, communication adapter 26 for connecting the information handling system to a data processing network, and display adapter 28 for connecting bus 4 to display device 30.

Figure 2:
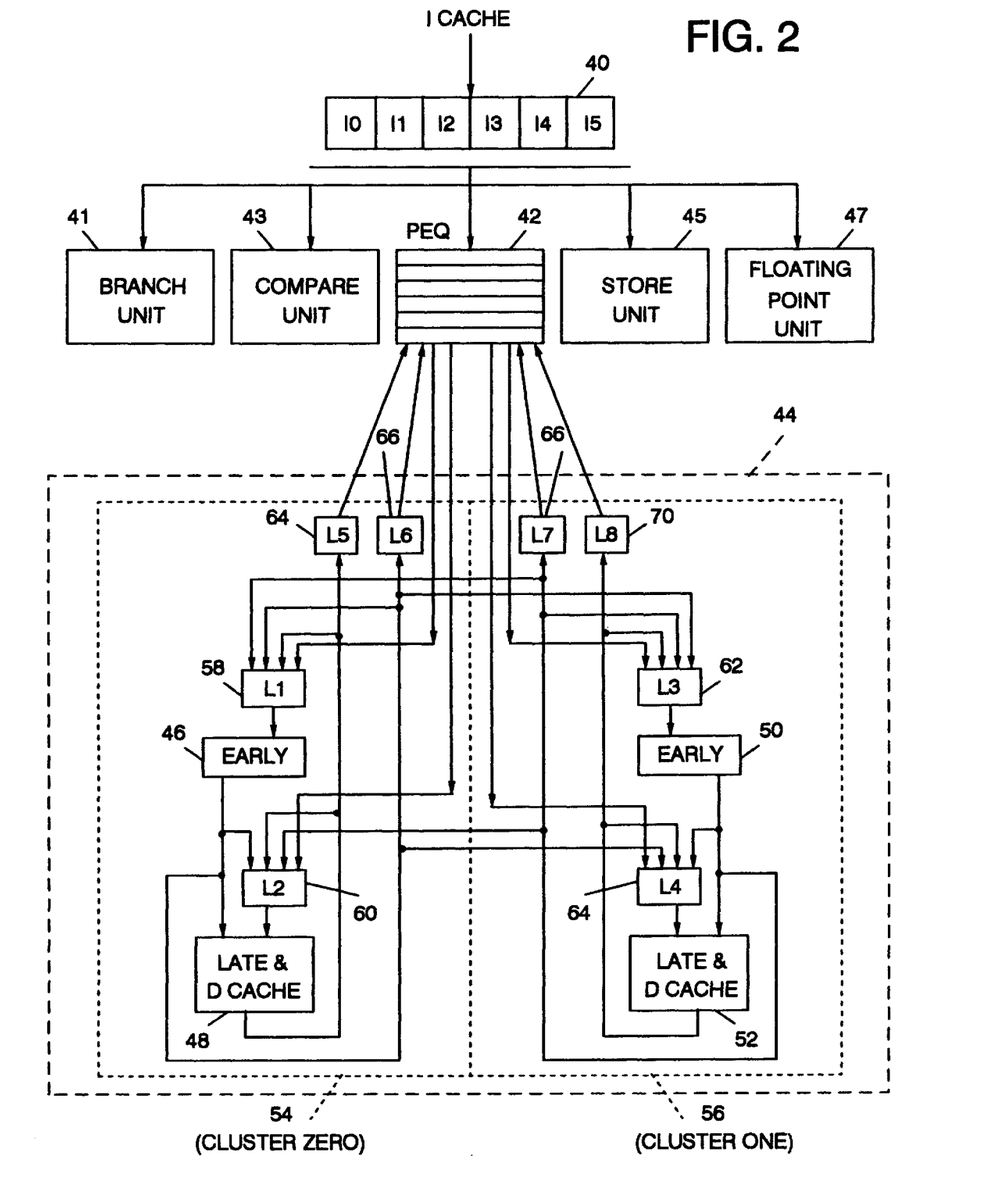
FIG. 2 is a block diagram of the architecture of a system embodying the present invention, including a high-level view of the instruction queue, the pre-execution queue, and the fixed point unit.

FIG. 2 shows a high level overview of a CPU 2, comprising an instruction queue 40, a pre-execution queue (PEQ) 42, a fixed point unit 44, a branch unit 41, a compare unit 43, a store unit 45, and floating point unit 47. Fixed point unit 44 consists of four execution units, 46, 48, 50, and 52, which are arranged in two clusters, cluster zero 54 and cluster one 56. Each cluster 54, 56 has an early execution unit 46, 50 and a late execution unit 48, 52. To avoid timing problems with forwarding data to multiple destinations, the results from each execution unit 46, 48, 50, 52 are forwarded non-uniformly depending on the location of the destination and the time when the result is available.

The instructions in the instruction queue come from an instruction cache or other memory units (not shown). Instructions are gated into PEQ 42, which holds instructions and data to be sent to the clusters 54, 56. Instructions and data are sent from PEQ 42 to latches L1 58, L2 60, L3 62, and L4 64. Instructions and data are gated from the latches into the execution units. For example, instructions and data are gated from latch 58 into execution unit 46. Any result from an execution unit 46, 48, 50, 52 may also be sent to any latch L1 58, L2 60, L3 62, or L4 64 for further processing by the execution unit associated with the particular latch. Latches L5 64, L6 66, L7 68, and L8 70 receive the results from each execution unit 46, 48, 50, 52 and then send these results back to PEQ 42 for further processing.

Fixed point clusters 54, 56 have the following characteristics. The early unit in a cluster can forward the result to the late unit in the same cluster to be used in the same cycle. For example, an instruction executing in early unit 46 in cycle n can forward the result to late unit 48 in the same cluster 54 so that a dependent instruction can use that result and execute in late unit 48 in cycle n (0 cycle forwarding). The late unit in a cluster can forward the result to the early unit in the same cluster so that the result is available for execution in the early unit during the cycle after the result is generated (one cycle forwarding within a cluster). For example, an instruction executing in late unit 48 in cycle n can forward the result to early unit 46 in the same cluster 54 so that a dependent instruction can use that result and execute in early unit 46 in cycle n+1.

The early unit in a cluster (local cluster) can forward the result to the execution units in another cluster (remote cluster) so that the result is available for execution in the remote cluster during the cycle after the result is generated. For example, an instruction executing in early unit 46 of local cluster 54 in cycle n can forward the result to either early unit 50 or late unit 52 of remote cluster 56 so that a dependent instruction can use that result and execute in early unit 50 or late unit 52 in cycle n+1.

The late unit in a local cluster can forward the result to the execution units of a remote cluster one cycle after the result is generated (two cycle forwarding between clusters). For example, an instruction executing in late unit 48 of local cluster 54 in cycle n can forward the result to either early unit 50 or late unit 52 of remote cluster 56 so that a dependent instruction can use that result and execute in early unit 50 or late unit 52 in cycle n+2.

All units in the clusters can forward the result to the GPR (not shown) and PEQ 42 one cycle after the result is generated (two cycle forwarding).

A load instruction can only execute in the late unit of a cluster.

To keep all units in the clusters operating efficiently, the instruction issuing unit, PEQ 42, must take into account the non-uniform forwarding of the result data by the execution units within and between the clusters when scheduling instructions to the clusters. In addition, PEQ 42 must schedule only instructions of operands which are available. However, out-of-order issuing is allowed.

PEQ 42 must also provide a fast recovery method in the case that speculative instructions are scheduled and aborted. For example, instructions may be scheduled on the assumption that a particular branch will take a certain path, and instead the branch takes an alternate path. There is also the possibility that an exception will occur between two scheduled instructions.

In addition, PEQ 42 must only schedule certain instructions, such as load instructions to the late units. Finally, PEQ 42 must implement the above features in a simplified way to meet the cycle time of the processor.

The instruction queuing and issuing mechanism has the following features. PEQ 42 acts as a reservation station, and holds instructions and their data to be issued to the clusters 54, 56. A set of latches implementing a priority array (shown in FIGS. 3 and 5), keeps track of the relative ages of instructions in PEQ 42. A set of bits in PEQ 42 is used to indicate that operands are available for an instruction. Only instructions with available operands are selected by PEQ 42 to be issued to clusters 54, 56.

Another set of bits in PEQ 42 allows dependent instructions to be "paired," i.e., instructions A and B are paired if instruction A is not a load and instruction A generates the result that instruction B uses. PEQ 42 will try to issue the pair AB together to the same cluster (A to the early unit and B to the late unit) to take advantage of the early to late unit 0 cycle forwarding.

Still another set of bits in PEQ 42 keeps track of where the result is being generated so that a dependent instruction that uses that result will be issued to the proper cluster. For example, if instruction A is executing in late unit 48 of cluster zero 54, PEQ 42 will try to issue instruction B, which is dependent on A, to cluster zero 54 to take advantage of the one cycle forwarding of data within a cluster.

An instruction classification scheme groups instructions into buckets. The instruction selection logic operates on each bucket concurrently. The instruction selection time is improved as the instruction selection process is changed from selecting instructions sequentially to selecting instructions from buckets in parallel. For example, assume instruction A is executing in early unit 46 of cluster zero 54 in cycle n. Instruction B which depends on A can execute in late unit 48 of cluster zero 54 in cycle n. B can execute in any of the four units 46, 48, 50, 52 in cycle n+1 or afterward.

As another example, assume instruction A is executing in late unit 48 of cluster zero 54 in cycle n. Instruction B, which depends on A, can execute in either execution unit 46, 48 of cluster zero 54 in cycle n+1. B can execute in any of the four units 46, 48, 50, 52 in cycle n+2 or afterward.

Figure 3:
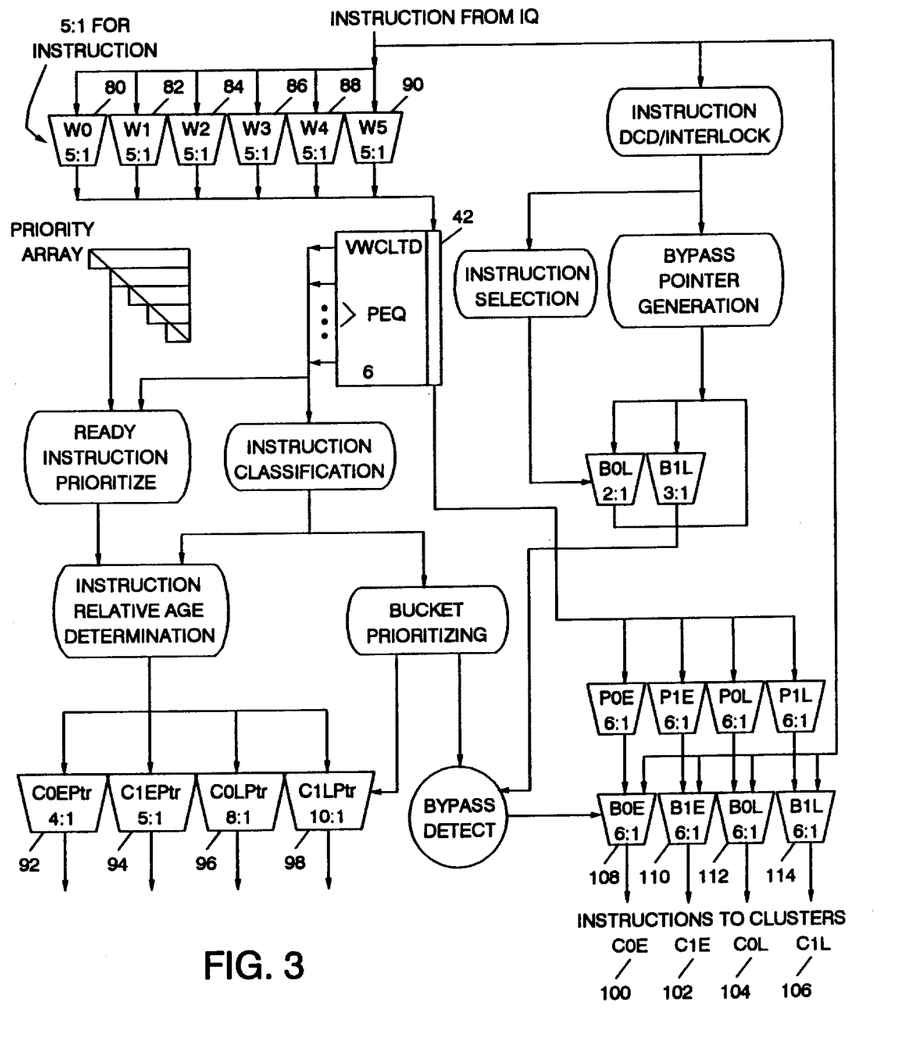
FIG. 3 is a block diagram of an apparatus for dispatching instructions.

FIG. 3 shows the instruction flow through PEQ 42. Instructions are dispatched from Instruction Queue (IQ) 40, shown in FIG. 2. They are gated into PEQ 42 through multiplexers 80, 82, 84, 86, 88, 90. Controls for instruction selection are calculated and gated through four multiplexers: C0Eptr 92, C1Eptr 94, C0Lptr 96, and C1Lptr 98. Instructions from PEQ 42 are gated out through four buses: C0E 100 (to cluster zero early unit 46), C1E 102 (to cluster one early unit 50), C0L 104 (to cluster zero late unit 48), and C1L 106 (to cluster one late unit 52). If there is no available instruction in PEQ 42, then dispatched instructions can be bypassed directly to execution units 46, 48, 50, 52 through four multiplexers: B0E 108, B1E 110, B0L 112, and B1 114.

Figure 4:
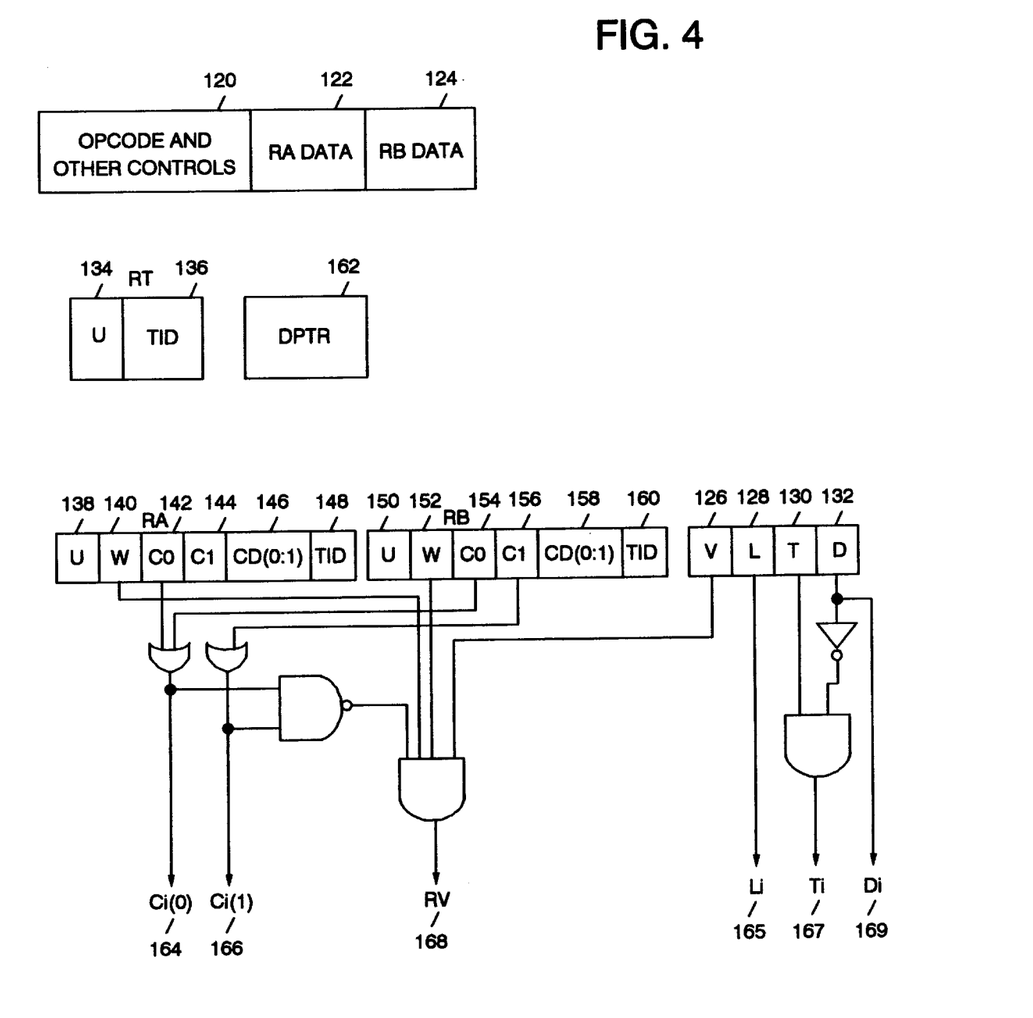
FIG. 4 is a diagram of an instruction and its associated status bits.

FIG. 4 shows the fields for each entry of PEQ 42. Each entry consists of an opcode and other controls 120, RA data 122, and RB data 124. Bits that are associated with each PEQ entry are as follows:

V 126: indicates whether entry is valid.

L 128: indicates whether instruction is a load instruction.

T 130: indicates whether instruction is the earlier (target) instruction of a dependent pair instruction. (Note that if an instruction is a dependent instruction, it is not treated as the target instruction. However, if it becomes an independent instruction, i.e., its D 132 bit is reset, and if its T 130 bit is set, then it automatically becomes the target instruction).

D 132: indicates whether instruction is the later instruction (depends on a target instruction) of a dependent pair.

RT (instruction target is GPR):
  U 134: indicates whether field is valid.
  TID 136: indicates target ID of GPR to which instruction will be sent. TID 136 is the pointer to be used for operand interlock. TID 136 also is the instruction identifier.

RA (instruction source is GPR):
  U 138: indicates whether field is valid.
  W 140: indicates whether RA field is loaded (if RA is not used, this bit is set to 1 at dispatch).
  C0 142, C1 144: indicates whether operand is dependent on the instruction being executed in the late unit of the cluster (bit 0 for cluster zero, bit 1 for cluster one). These bits are active for one cycle to steer this instruction to the unit that has the data.
  CD 146: C0 142, C1 144 bits delayed by a cycle. PEQ 42 uses CD 146 to reset the W bit 140 if data is canceled.
  TID 148: the target ID of the GPR which will provide the necessary instruction.

RB (instruction source is GPR):
  U 150: indicates whether field is valid.
  W 152: indicates whether RB field is loaded (if RB is not used, this bit is set to 1 at dispatch).
  C0 154, C1 156: indicates that operand is dependent on the instruction being executed in the late unit of the cluster (bit 0 for cluster zero, bit 1 for cluster one). These bits are active for one cycle to steer this instruction to the unit that has the data.
  CD 158: C0 154, C1 156 bits delayed by a cycle. PEQ 42 uses CD 158 to reset W bit 152 if data is canceled.
  TID 160: target ID of the GPR which will provide the necessary information.

DPTR 162: Points to the entry that contains the instruction that depends on this instruction. It is valid when the T 130 bit is active.

FIG. 4 also shows the following PEQ 42 instruction state indicators, which are the combinations of individual bits described above to specify the state of each entry in PEQ 42:

Ci(0) 164: indicates that instruction is dependent on the instruction being executed in late unit 48. This bit is the "OR" of the C0 bits 142, 154 of the two operands.

Ci(1) 166: indicates that instruction is dependent on the instruction being executed in late unit 52. This bit is the "OR" of the C1 bits 144, 156 of the two operands RV 168: indicates that instruction is ready for execution. This bit is the combination of the two operand available bits W 140, W 152, queue entry valid bit V 126, and the two C bits 164, 166 (note that an instruction is not ready if it depends on operands that are being generated in both late units).

Li 165: indicates that instruction is a load.

Ti 167: indicates that instruction is the target instruction of a dependent pair instruction and is not the dependent instruction.

Di 169: indicates that instruction is the dependent of a dependent pair instruction.

Dispatched instructions from the IQ 40, in the order of oldest to newest (IQ0 to IQ4), are gated into the lowest empty locations as indicated by PEQ valid bit V 126. The order of all entries in the six-entry deep PEQ 42 is marked by the bit priority array 170, shown in FIG. 5. Each bit called "n o m" indicates that entry n is older than entry m. Entry zero 172 has five bits (001 through 005), entry one 174 has four bits (102 through 105), etc.

Figures 5, 5A:
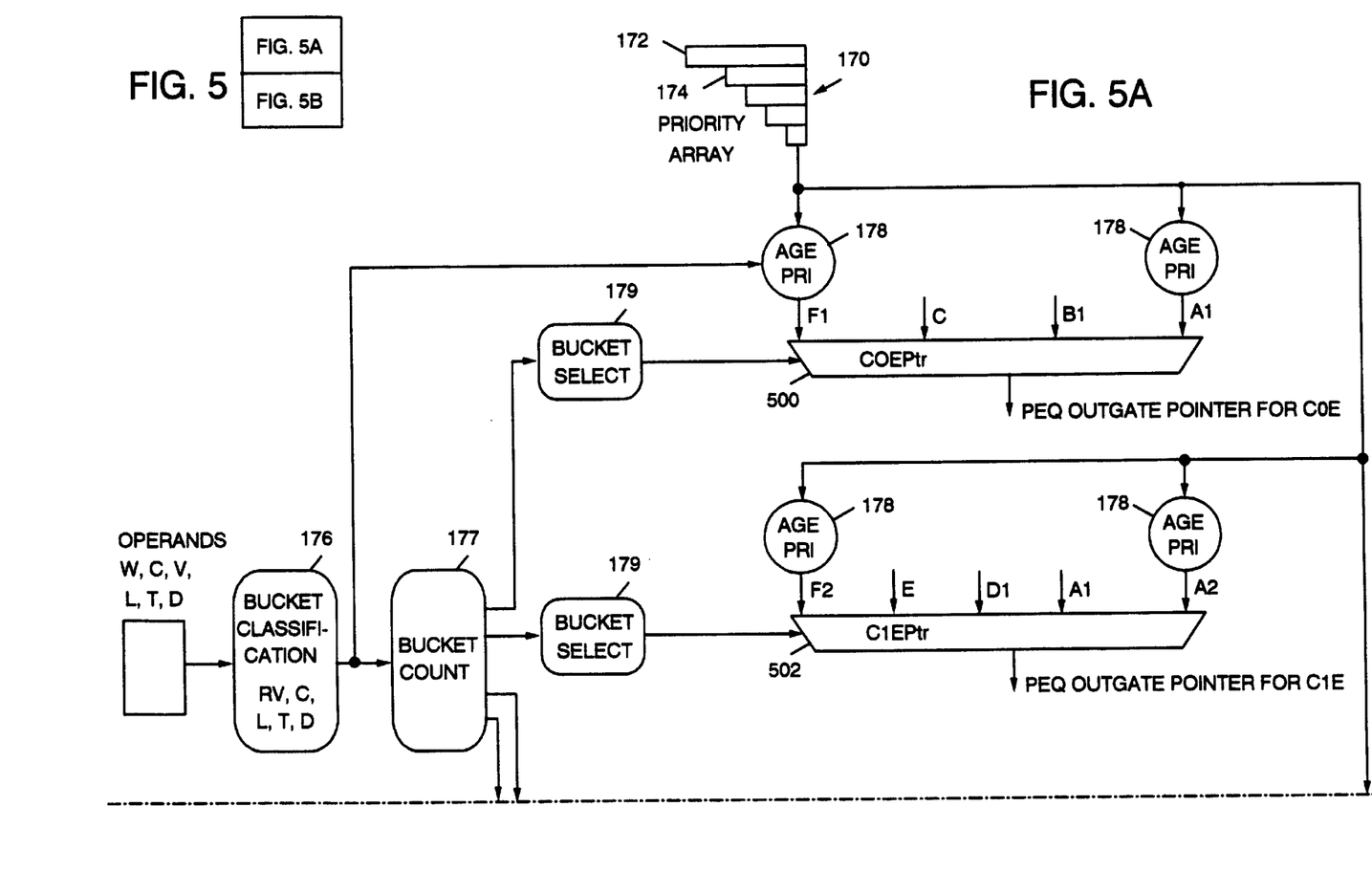
FIGS. 5, 5A, and 5B are a block diagram of an apparatus for classifying instructions.
Figure 5B:
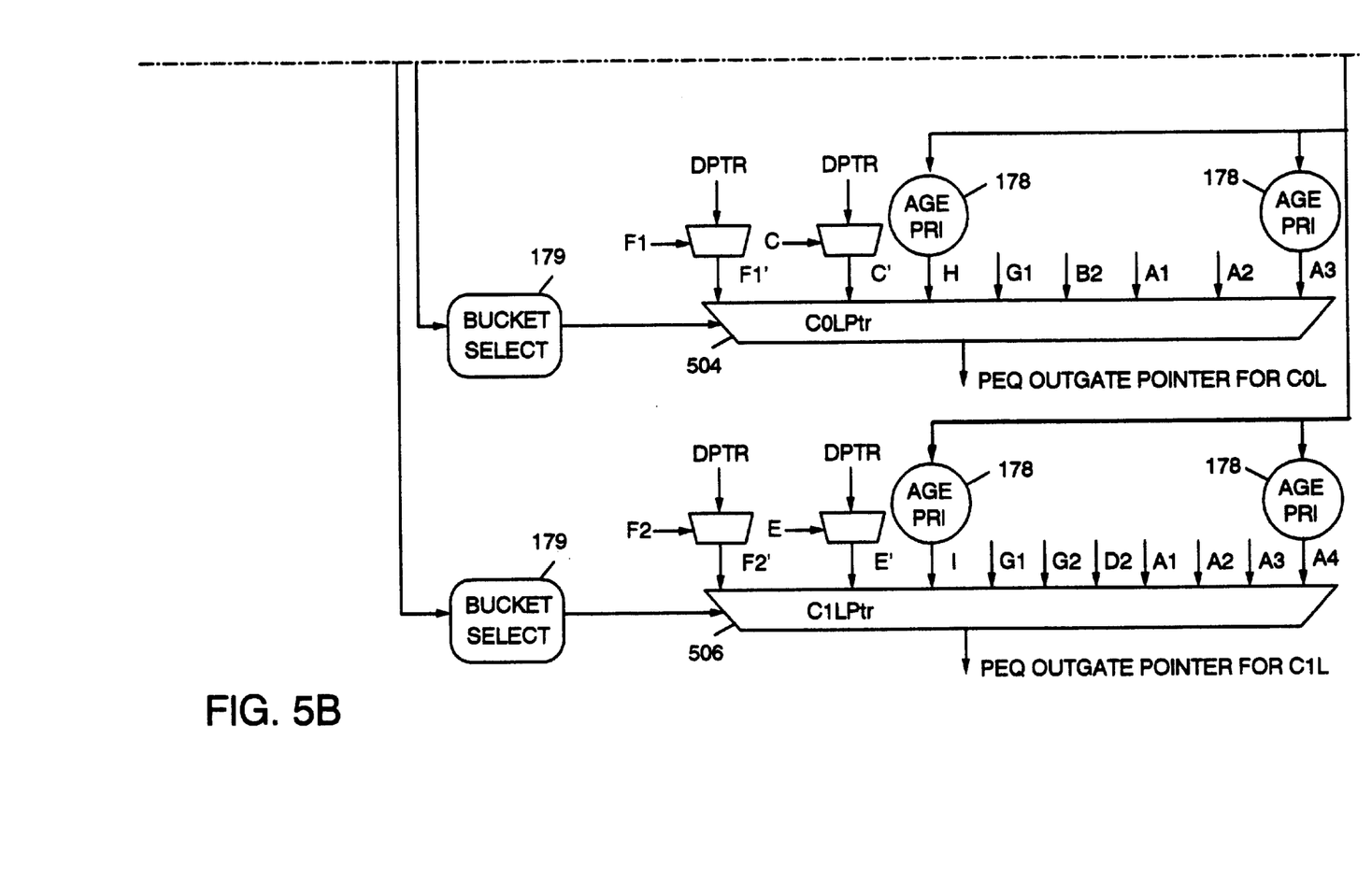

When instructions are dispatched, PEQ 42 is scanned for existing instructions, and priority array 170 is set to reflect the age of the instructions relative to other instructions in PEQ 42.

Dispatched instructions are checked against each other and against existing instructions in PEQ 42 to determine if they can be paired. An instruction may be paired to an older instruction being dispatched or existing in PEQ 42 if one of its source operands is the result of the older instruction (the TIDs are used to determine the interlock), and the older instruction is not a load.

When a dispatched instruction is detected to be dependent on a prior instruction, the dependent instruction's PEQ position is saved with the target instruction in the DPTR 162 field in FIG. 4. The T bit 130 of the target instruction is set, and the D bit 132 of the dependent instruction is set. If multiple instructions are dependent on the same target instruction, only the oldest dependent instruction is paired with the target instruction. If two sources of an instruction depend on two different instructions, then "pairing" is performed on the RA source of the dependent instruction only. If the target of a pair of instructions is issued and the dependent instruction is not issued (i.e., the late unit is not available), then the D bit 132 of the dependent operand is reset. This allows the dependent instruction to become an independent instruction in the next cycle.

Each source operand in PEQ 42 has an associated W (written) bit 140, 152 to indicate if the data for that operand is available. The W bit 140, 152 is set at dispatch if the data is in the GPR, if the source is not needed by the instruction, or if the dispatching sources match any TID being broadcast during the cycle. If the entry is the dependent instruction of a dependent pair, then the dependent source is marked as ready.

One cycle before the result appears on the earliest result bus, the TID associated with that result is broadcast to PEQ 42. It is compared against all source TIDs in PEQ 42. If there is a match, the W bit 140, 152 for that source field is set. When the W bit 140, 152 is set it stays set until it is overlaid with a new entry (an older instruction in the queue has been issued or canceled). It is also reset if the corresponding data which is supposed to be generated by the unit is not valid (i.e., cache miss condition).

A PEQ entry is ready for dispatch to one of the execution units 46, 48, 50, 52 if the entry is valid (V=1), it does not depend on instructions being executed in different clusters, and either it is not the dependent instruction of a dependent pair and its two source operands are ready (W=1), or it is the dependent instruction of a dependent pair and its independent source operand and the instruction it depends on are ready. This is accomplished by keeping the DPTR 162 pointing to the instruction which depends on it and setting the W bit 140, 152 of the dependent source unconditionally.

Each source operand also has a two bit C field 142, 144 or 154, 156 to indicate which, if any, late unit in the cluster is generating the data for this operand. The C field 142, 144 or 154, 156 is set when the W bit 140, 152 is set as a result of a match of the source operand TID 148, 160 and the broadcast TID from the corresponding late unit.

Figure 6A:
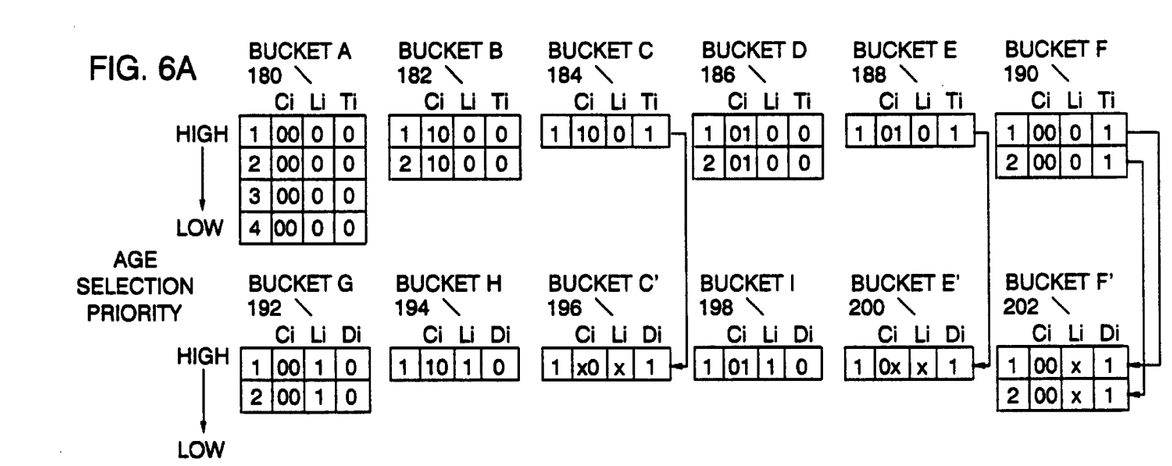
FIG. 6A shows the logical sequence of the classification performed by the apparatus of FIG. 5.

As shown in FIG. 5, ready instructions in PEQ 42 are classified into buckets by examining the RV, Ci, Li, Ti, Di state indicators of the instruction in each entry. FIG. 6A illustrates the different bucket types. The buckets are:

Type A 180 (Ci=00, Li=0, Ti=0)
   Contains instructions that can go to either cluster, early or late unit, and are not targets for dependent pair instructions.

Type B 182 (Ci=10, Li=0, Ti=0)
   Contains instructions that only go to cluster zero, early or late unit, and are not targets for dependent pair instructions.

Type C 184 (Ci=10, Li=0, Ti=1)
   Contains instructions that only go to cluster zero, early or late unit, and are targets for dependent pair instructions.

Type D 18G (Ci=01, Li=0, Ti=0)
   Contains instructions that only go to cluster one, early or late unit, and are not targets for dependent pair instructions.

Type E 188 (Ci=01, Li=0, Ti=1)
   Contains instructions that only go to cluster one, early or late unit, and are targets for dependent pair instructions.

Type F 190 (Ci=00, Li=0, Ti=1)
   Contains instructions that go to either cluster, early or late unit, and are targets for dependent pair instructions.

Type G 192 (Ci=00, Li=1, Di=0)
   Contains instructions that can go to the late unit of either cluster and are not dependent instructions of dependent pair instructions.

Type H 194 (Ci=10, Li=1, Di=0)
   Contains instructions that only go to the late unit of cluster zero and are not dependent instructions of dependent pair instructions.

Type C' 196 (Ci=x0, Li=x, Di=1)
   Contains dependent instructions of which the targets are in group C.

Type I 198 (Ci=01, Li=1, Di=0)
   Contains instructions that only go to the late unit of cluster one and are not dependent instructions of dependent pair instructions.

Type E' 200 (Ci=0x, Li=x, Di=1)
   Contains dependent instructions of which the targets are in Group E.

Type F' 202 (Ci=00, Li=x, Di=1)
   Contains dependent instructions of which the targets are in group F.

FIG. 5 shows the process of selecting instructions from PEQ 42 to issue to Fixed Point unit 44. It consists of three steps:

Bucket Classification 176: group ready instructions (Rv=1) into the appropriate bucket 180–202 (see FIG. 6A).

Age prioritization 178: calculate the relative ages of the ready instructions (RV=1) in each bucket. This is accomplished by examining priority array latches 170 and generating the pointer that points to the PEQ entry that contains the instruction. For example, if the oldest ready instruction in the F bucket is in entry number 3 of PEQ 42, then the F1 input of multiplexer 500 will have a value of 3.

Bucket selection 177, 179: count the number of ready instructions within a bucket and generate the select controls to multiplexer 500, 502, 504, 506. This is accomplished by counting the number of instructions within a bucket and examining the count to generate the select controls. For example, if there is one instruction in the F bucket, at least one instruction in the E bucket, two instructions in the bucket, and no instruction in other buckets, then the control to multiplexer 500 will select input F1, the control to multiplexer 502 will select input E, the control to multiplexer 504 will select input G1, the control to multiplexer 506 will select input G2

Figure 6B:
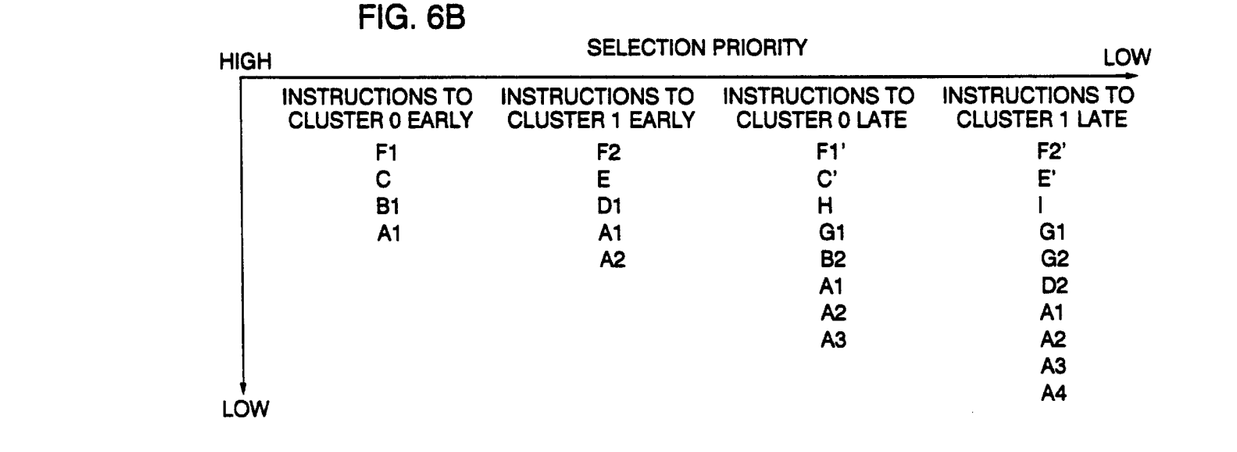
FIG. 6B depicts a logical selection table as used in the logical sequence of FIG. 6A.

FIG. 6A shows the bucket classification. The age prioritizing within each bucket is shown vertically (top to bottom for each bucket). FIG. 6B shows the logical selection table. Each column contains the candidates for each execution unit 46, 48, 50, 52, where the letter specifies the instruction bucket assigned to each execution unit 46, 48, 50, 52, and the number specifies the relative age of the instruction within a particular bucket. Only one instruction per column can be selected. The selection priority is from left to right and top to bottom. For example, if A1 (this notation refers to the oldest instruction in bucket A) is selected for cluster zero early unit 46, then from bucket A only A2 may be selected for cluster one early unit 50.

Preferably, the maximum number of instructions in each bucket matches the number of execution units. For example, bucket A (180 in FIG. 6A) has four instructions which can go to any of the four execution units 46, 48, 50, 52, bucket C (184 in FIG. 6A) has two instructions since they must go to cluster zero which has only two execution units 46, 48. By doing so, this invention allows an implementation of a "deep" PEQ, i.e., a PEQ having more entries than the number of execution units, while confining the selection process to a manageable number of instructions within each bucket.

Note that as instructions are issued and executed, the state bits in PEQ 42 change dynamically and the instructions are dynamically reassigned into different buckets with different relative age. This is caused by instruction interaction at execution, such as with issued priority conflicts (i.e., instruction 18 in cycle 3), conditions that cause delay in execution (cache miss, multi-cycle operations), mispredicted branch instructions, or interrupts. Also note that store instructions and branch instructions are issued to their respective queues and do not appear in PEQ 42.

Figure 8:
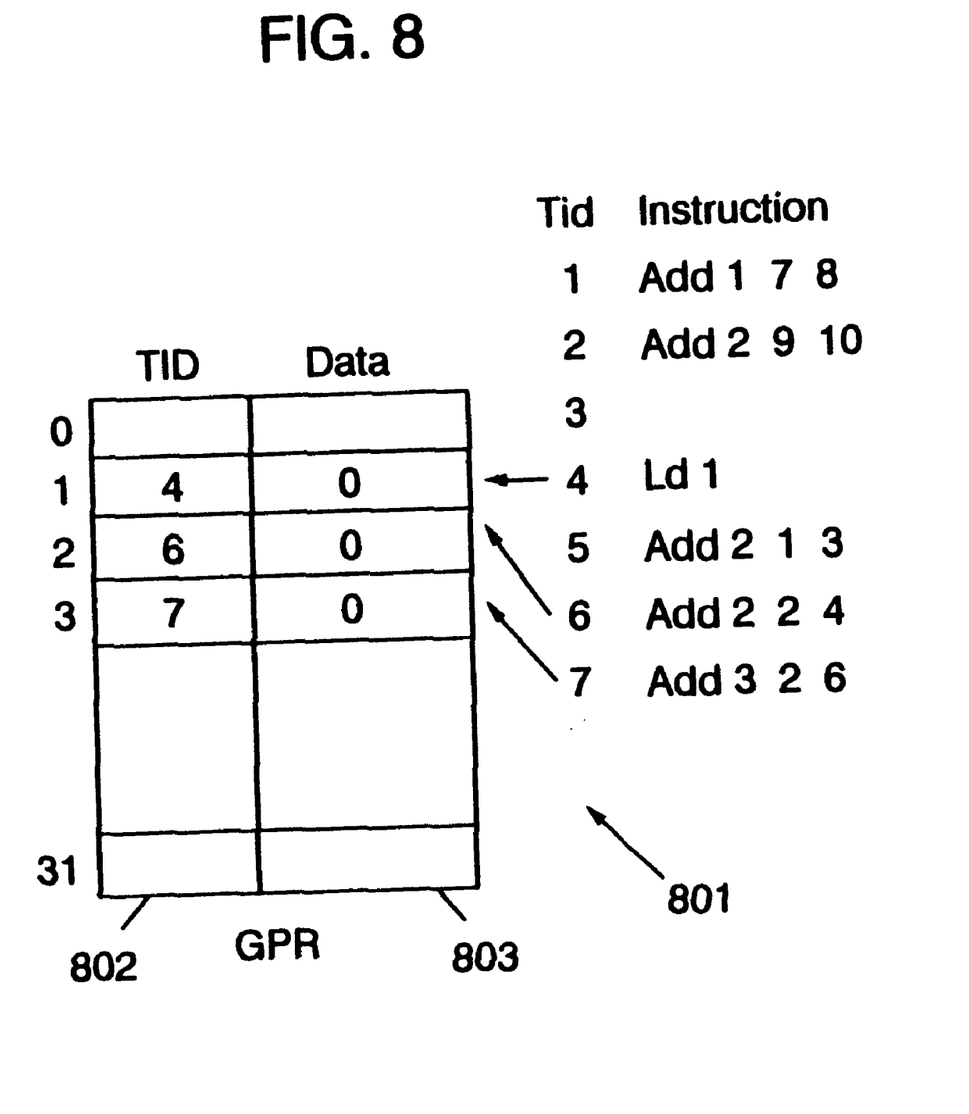
FIG. 8 illustrates a structure of GPR 801.

Referring next to FIG. 8, there is illustrated a structure of a GPR 801. GPR 801 is a 32-entry array, which contains the TID 802 and data 803. The TID 802 is a unique tag that is assigned to each target GPR at the time the instruction is dispatched from IQ 40. The TID is written into the target GPR entry at dispatch. At dispatch the TID 802 is also assigned to the dispatching instruction and is tagged along with the instruction as it moves through the CPU. When the instruction that sets that GPR is executed and data is sent back to be written to the GPR array 801, the TID 802 at the target GPR location is compared with the TID of the instruction. If the two TIDs match, then the data 803 is allowed to be written into the GPR array. This process ensures that only the youngest instruction that sets a GPR is allowed to update that GPR location. A dispatching instruction that uses a GPR reads the GPR array 801 to get data 803 or the TID 802 of that GPR. If data 803 is not available at dispatch time, then the TID of the source GPR is tagged with the instruction that needs that data. When an instruction that sets a GPR executes, it broadcasts its TID to other instructions in the PEQ 42. This broadcast TID is compared against all source TIDs in the PEQ 42 so that any instruction that depends on the instruction being executed can capture the data and can proceed to the execution stage.

The example shown in FIG. 8 illustrates that the TID of the newest instruction will write to the GPR 801. For example, instructions with TID1 and TID4 both write GPR1; after instruction with TID4 is dispatched, the TID associated with GPR1 is 4.

Figure 7:
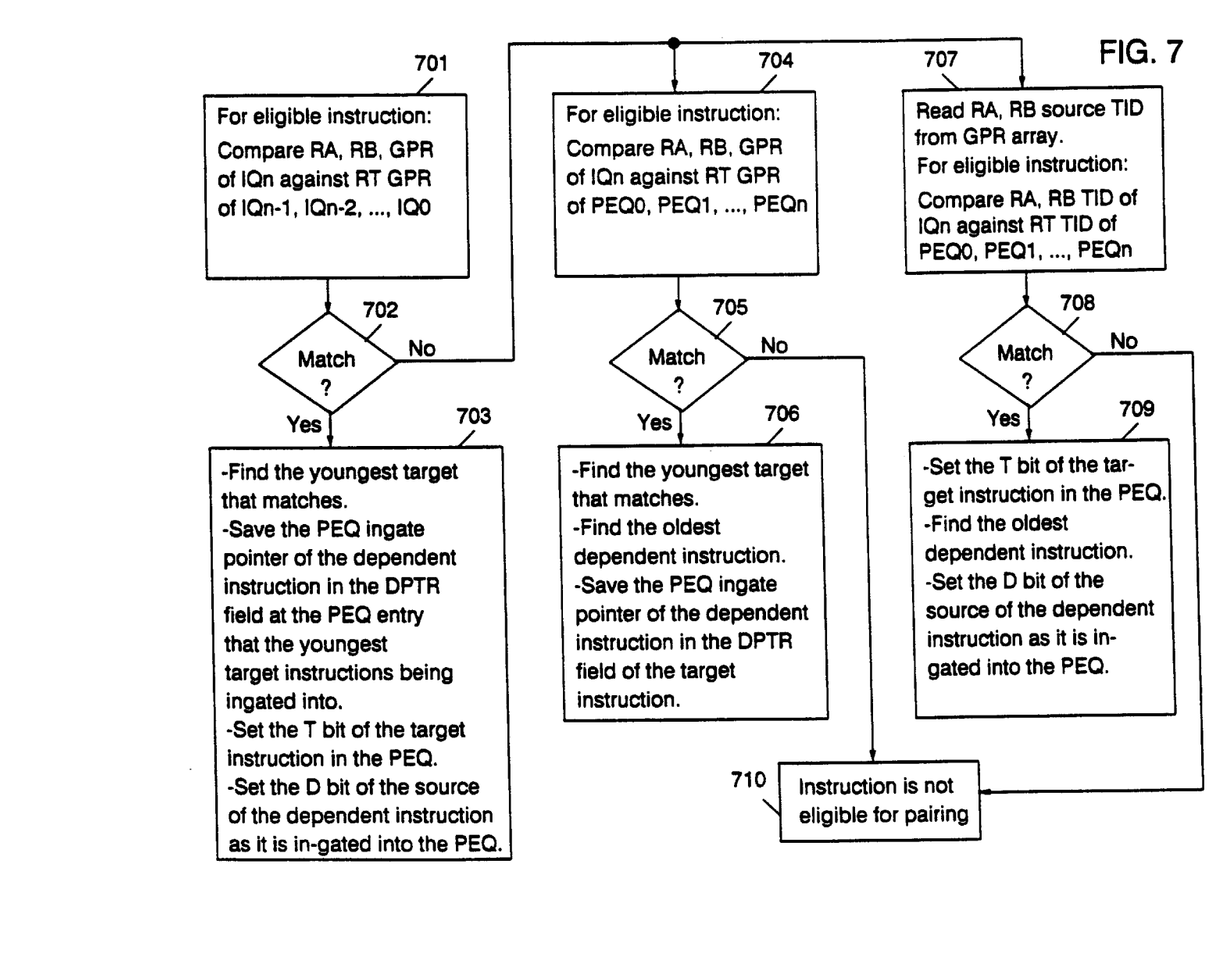
FIG. 7 illustrates a flow diagram in accordance with the present invention.

FIG. 7 shows the process of pairing one dependent instruction to a target instruction by the PEQ 42. These steps are repeated for each dispatched instruction. Note that the sequential processes are for illustrative purpose only. Actual implementation may perform one or more of the steps in parallel. Pairing is performed on eligible instructions. An instruction eligible for pairing is one where one of its source operands is the result of an older instruction, and the older instruction is not a load, and the older instruction has not been paired with another instruction. If both sources of an instruction depend on different target instructions, then only the RA source operand is used to determine a pairing.

In step 701, within the group of instructions dispatched from IQ 40 to PEQ 42, the GPR source pointers (RA, RB GPR) of newer instructions are compared against the GPR target pointers (RT GPR) of the older instructions. If there is a match (step 702), the youngest target instruction is paired with the oldest dependent instruction in step 703. As the target instruction is in-gated into the PEQ 42 its DPTR 162 field is set to point to the PEQ 42 location that the dependent instruction is in-gated into, and the T bit 130 is set. As the dependent instruction is in-gated into the PEQ 42, its D bit 32 for each of its source operands is set.

Substantially, simultaneously with step 701, step 704 may be performed where the GPR source pointers (RA, RB GPR) of the instructions dispatched from IQ 40 to PEQ 42 are compared against the GPR target pointers (RT GPR) of the instructions already in the PEQ 42. If there is a match in step 705, the oldest dependent instruction being dispatched is paired with the youngest target instruction in the PEQ 42 in step 706. If the dependent instruction is not paired with any dispatched instruction, then as the dependent instruction is in-gated into the PEQ 42 its PEQ 42 location is saved in the DPTR 162 field of the target instruction. This step is performed to avoid the cycle inhibiting process of accessing the GPR to obtain the TID, do the comparison, and then calculate the DPTR.

Step 704 may produce multiple matches as a result of:
Multiple dispatched instructions from IQ 40 depend on the same target instruction in the PEQ 42.
For example:

| Dispatching instructions: | Add1 (3) <-- (1),(2) | older |
| | Add2 (4) <-- (1),(6) | younger |
| Instruction in PEQ 42: | Add0 (1) <-- (7),(8) | |

In this example both "Add1" and "Add2" use GPR1. Both instructions are dispatched in the same cycle, "Add2" is younger than "Add1." "Add0" in the PEQ 42 sets GPR1. The DPTR of "Add0" will be set to contain the PEQ pointer of the oldest dispatching instruction, i.e., "Add1," when the dispatching instruction is in-gated into to the PEQ 42.

Dispatched instruction depends on multiple target instructions in the PEQ 42.
For example:

| Dispatching instructions: | Add2 (3) <-- (1),(6) | |
| Instruction in PEQ 42: | Add0 (1) <-- (7),(8) | older |
| | Add1 (1) <-- (9),(8) | younger |

In this example, both "Add0" and "Add1" set GPR1. Both instructions reside in the PEQ 42, wherein "Add0" is older than "Add1." Dispatched instruction "Add2" uses GPR1. Step 704 will provide two hits for instruction "Add2." The priority array 170 is accessed to determine which hit is to the youngest instruction in the PEQ 42. In this example, it is to instruction "Add1." The DPTR of the youngest hit in the PEQ 42, i.e., "Add1," will be set to contain the PEQ pointer of "Add2" when "Add2" is in-gated into the PEQ 42.

Simultaneously with step 704, the GPR array (see FIG. 8) is accessed to obtained the TIDs of the source operands of the dispatched instructions in step 707. These TIDs are compared against the target TID (RT TID) of instructions in the PEQ 42. A match (step 708) will guaranty that the DPTR obtained from the step described above is correct. As the oldest dependent instruction is in-gated into the PEQ 42, its corresponding source D bit 132 is set.

Step 707 is needed to ensure that the target instruction of which a match is generated from step 704 is the youngest target in the CPU.

For example, consider the following three instructions.

| Add0 (1) <-- (6),(7) | oldest |
| Add1 (1) <-- (8),(9) | |
| Add2 (4) <-- (1),(6) | youngest |

"Add0" and "Add1" were dispatched and for some reason "Add1" was executed and was removed from the PEQ 42. While "Add0" remains in the PEQ 42, "Add2" is dispatched. Step 704 indicates that there is a match, step 706 produces a DPTR for "Add0" that points to "Add2" in the PEQ 42. However, when "Add2" accesses the GPR at dispatch, the TID associated with GPR1 is the TID of "Add1" which is different from the TID of "Add0." Step 707 does not produce a match, thus the T bit of "Add0" and the D bit of "Add2" are not set. The T and D bits not being set prevent "Add0" and "Add2" from being considered as a pair of instructions.

Calculating the DPTR requires tag comparison, and then using the comparison to access the priority array to determine the age (youngest) of the target instruction. As a result, the tag used in the comparison is the GPR pointer itself (not the TID of the GPR). Setting the D and T bit does not require accessing the priority array to find the youngest target (a match in the TID comparison guarantees that the matched target instruction is the youngest one).

When the PEQ 42 selects instructions for issuing it examines the D 132, T 130 and DPTR 162 bits along with other control bits (not shown) to determine if a pair should be selected. The PEQ issuing algorithm for this implementation has been described above.

If no match occurs in either step 705 or 708, then the process proceeds to step 710 where the instruction is not eligible for pairing.

The D 132 and T 130 bit for an instruction can both be active. If a target instruction is issued but the dependent instruction is not then the D 132 bit of the dependent instruction is reset. For an instruction that has both D 132 and T 130 bit active, if its D 132 bit is reset, then it dynamically becomes the target of a pair of instructions. The pairing algorithm pairs instructions that are dispatched against each other and against instructions that are left in the PEQ 42. It removes the restriction that instructions must be adjacent or close to each other to be paired.

Although the present invention and its advantages have been described in detail, it should be understood that various changes, substitutions and alterations can be made herein without departing from the spirit and scope of the invention as defined by the appended claims.

What is claimed is:

1. A method for dispatching instructions in a data processing system, the method comprising the steps of:

determining if a first instruction is dependent upon a second instruction; and pairing the first and second instructions for dispatch, wherein the first and second instructions do not have contiguous addresses.

2. The method as recited in claim 1, wherein the determining step further comprises the step of:

determining if an operand of the first instruction depends upon a result of the second instruction.

3. The method as recited in claim 1, wherein the first and second instructions are included in a group of instructions transferred from an instruction queue to a pre-execution queue.

4. The method as recited in claim 3, wherein the determining step further comprises the step of:

comparing a general purpose register source pointer of the first instruction with a general purpose register target pointer of the second instruction.

5. The method as recited in claim 4, wherein if there is a match between the source pointer and the target pointer, then (1) the second instruction is linked to the first instruction, (2) the first instruction is tagged as a target instruction, and (3) the second instruction is tagged as a dependent instruction.

6. The method as recited in claim 3, wherein the pre-execution queue receives the first and second instructions from the instruction queue and then gates the first and second instructions into a plurality of execution units, and then receives the results of the operations performed on the first and second instructions by the plurality of execution units.

7. The method as recited in claim 3, wherein the instruction queue issues the first and second instructions out of order with respect to each other.

8. The method as recited in claim 1, wherein the first instruction is being transferred from an instruction queue to a pre-execution queue and the second instruction is already located in the pre-execution queue.

9. The method as recited in claim 8, wherein the determining step further comprises the step of:

comparing a general purpose register source pointer of the first instruction with a general purpose register target pointer of the second instruction.

10. The method as recited in claim 9, wherein if there is a match between the source pointer and the target pointer, then the second instruction is linked to the first instruction.

11. The method as recited in claim 8, wherein the determining step further comprises the step of:

comparing a tag associated with the first instruction with a tag associated with the second instruction.

12. The method as recited in claim 8, wherein the determining step further comprises the steps of:

comparing a general purpose register source pointer of the first instruction with a general purpose register target pointer of the second instruction; and comparing a tag associated with the first instruction with a tag associated with the second instruction.

13. A processor comprising:

an instruction queue;

a pre-execution queue coupled to the instruction queue;

an execution cluster coupled to the pre-execution queue;

circuitry for determining if an operand of a first instruction depends upon a result of a second instruction, wherein the first and second instructions are included in a group of instructions transferred from the instruction queue to the pre-execution queue, wherein the first and second instructions do not have contiguous addresses;

circuitry for pairing the first and second instructions for dispatch to the execution cluster when a general purpose register source pointer of the first instruction matches a general purpose register target pointer of the second instruction.

14. The processor as recited in claim 13, further comprising:

circuitry for determining if an operand of the first instruction depends upon a result of a third instruction, wherein the third instruction is already located in the pre-execution queue; and circuitry for pairing the first instruction with the third instruction for dispatch to the execution cluster when the general purpose register source pointer of the first instruction matches a general purpose register target pointer of the third instruction.

15. The processor as recited in claim 14, wherein the first instruction is paired with the third instruction when the first instruction has not been paired with the second instruction.

16. The processor as recited in claim 15, wherein the first instruction is paired with the third instruction when the third instruction is not a load instruction.

17. The processor as recited in claim 14, wherein if there is a match between the source pointer and the target pointer, then a field associated with the second instruction is set to point to a location in the pre-execution queue where the first instruction will reside.

18. The processor as recited in claim 13, wherein if there is the match between the source pointer and the target pointer, then the second instruction is linked to the first instruction.

19. The processor as recited in claim 13, wherein the pre-execution queue receives the first and second instructions from the instruction queue and then gates the first and second instructions into a plurality of execution units, and then receives the results of the operations performed on the first and second instructions by the plurality of execution units.

20. A data processing system, comprising:

a processor coupled to an input device, an output device, and a memory device by a bus system, where in the processor further comprises:

an instruction queue;

a pre-execution queue coupled to the instruction queue;

an execution cluster coupled to the pre-execution queue;

means for determining if an operand of a first instruction depends upon a result of a second instruction; and means for pairing the first and second instructions for dispatch to the execution cluster, wherein the first and second instructions do not have contiguous addresses.

21. The system as recited in claim 20, wherein the first and second instructions are included in a group of instructions transferred from the instruction queue to the pre-execution queue.

22. The system as recited in claim 21, wherein the determining means further comprises:
means for comparing a general purpose register source pointer of the first instruction with a general purpose register target pointer of the second instruction.

23. The system as recited in claim 22, wherein if there is a match between the source pointer and the target pointer, then a field associated with the second instruction is set to point to a location in the pre-execution queue where the first instruction will reside.

24. The system as recited in claim 20, wherein the first instruction is being transferred from the instruction queue to the pre-execution queue and the second instruction is already located in the pre-execution queue.

25. The system as recited in claim 24, wherein the determining means further comprises:
means for comparing a general purpose register source pointer of the first instruction with a general purpose register target pointer of the second instruction.

26. The system as recited in claim 25, wherein if there is a match between the source pointer and the target pointer, then a field associated with the second instruction is set to point to a location in the pre-execution queue where the first instruction will reside.

27. The system as recited in claim 24, wherein the determining means further comprises:
means for comparing a tag associated with the first instruction with a tag associated with the second instruction, wherein the tags identify general purpose registers associated with the first and second instructions.

28. The system as recited in claim 20, wherein the pre-execution queue receives the first and second instructions from the instruction queue and then gates the first and second instructions into a plurality of execution units, and then receives the results of the operations performed on the first and second instructions by the plurality of execution units.

29. The system as recited in claim 20, wherein the execution cluster further comprises:
an early execution unit; and
a late execution unit, wherein the first and second instructions are forwarded to the early and late execution units, respectively, for execution during the same clock cycle.

30. The system as recited in claim 20, wherein the execution cluster further comprises:
an early execution unit; and
a late execution unit, wherein the first and second instructions are forwarded to the early and late execution units, respectively, so that a result of the late execution unit can be forwarded to the early execution unit for execution in a subsequent clock cycle.

31. The system as recited in claim 20, wherein the execution cluster comprises:
a first cluster unit having a first early execution unit and a first late execution unit; and
a second cluster unit having a second early execution unit and a second late execution unit.

32. The system as recited in claim 31, wherein the first early execution unit can forward its result to either the second early or second late execution units in the second cluster unit.

33. A method for dispatching instructions in a data processing system, the method comprising the steps of:
determining if a first instruction is dependent upon a second instruction; and
pairing the first and second instructions for dispatch, wherein the first and second instructions may or may not have contiguous addresses, wherein the first instruction is being transferred from an instruction queue to a pre-execution queue and the second instruction is already located in the pre-execution queue, wherein the determining step further comprises the step of comparing a general purpose register source pointer of the first instruction with a general purpose register target pointer of the second instruction; and
if there is the match between the source pointer and the target pointer, then as the first instruction is in-gated into the pre-execution queue the first instruction is linked to the second instruction.

34. A method for dispatching instructions in a data processing system, the method comprising the steps of:
determining if a first instruction is dependent upon a second instruction; and
pairing the first and second instructions for dispatch, wherein the first and second instructions may or may not have contiguous addresses,
wherein the determining step further comprises the steps of:
determining if an operand of the first instruction depends upon the result of the second instruction;
comparing a general purpose register source pointer of the first instruction residing within an instruction queue with a general purpose register target pointer of the second instruction residing within the instruction queue; and
comparing the general purpose register source pointer of the first instruction residing within the instruction queue with a general purpose register target pointer of a third instruction residing within a pre-execution queue,
wherein the comparing steps are performed in parallel.

35. A data processing system, comprising:
a processor coupled to an input device, an output device, and a memory device by a bus system, wherein the processor further comprises:
an instruction queue;
a pre-execution queue coupled to the instruction queue;
an execution cluster coupled to the pre-execution queue;
means for determining if an operand of a first instruction depends upon a result of a second instruction; and
means for pairing the first and second instructions for dispatch to the execution cluster, wherein the first and second instructions may or may not have contiguous addresses,
wherein the determining means further comprises:
means for comparing a general purpose register source pointer of the first instruction residing within an instruction queue with a general purpose register target pointer of the second instruction residing within the instruction queue; and
means for comparing the general purpose register source pointer of the first instruction residing within the instruction queue with a general purpose register target pointer of a third instruction residing within a pre-execution queue, wherein the two comparing means are operated in parallel.

36. A method for dispatching instructions in a data processing system, the method comprising the steps of:
   determining if a first instruction is dependent upon a second instruction; and
   pairing the first and second instructions for dispatch, wherein the first and second instructions do not have contiguous addresses, wherein the first and second instructions are included in a group of instructions transferred from an instruction queue to a pre-execution queue,
   wherein the determining step further comprises the step of comparing a general purpose register source pointer of the first instruction with a general purpose register target pointer of the second instruction, wherein when the comparing step results in more than one possible pairing of first and second instructions, the youngest second instruction is paired with the oldest first instruction.

37. A method for dispatching instructions in a data processing system, the method comprising the steps of:
   determining if a first instruction is dependent upon a second instruction; and
   pairing the first and second instructions for dispatch, wherein the first and second instructions do not have contiguous addresses, wherein the first instruction is being transferred from an instruction queue to a pre-execution queue and the second instruction is already located in the pre-execution queue,
   wherein the determining step further comprises the step of comparing a general purpose register source pointer of the first instruction with a general purpose register target pointer of the second instruction, and wherein when the comparing step results in more than one possible pairing of first and second instructions, the youngest second instruction is paired with the oldest first instruction.

38. A processor comprising;
   an instruction queue;
   a pre-execution queue coupled to the instruction queue;
   an execution cluster coupled to the pre-execution queue;
   circuitry for determining if an operand of a first instruction depends upon a result of a second instruction, wherein the first and second instructions are included in a group of instructions transferred from the instruction queue to the pre-execution queue; and
   circuitry for pairing the first and second instructions for dispatch to the execution cluster when a general purpose register source pointer of the first instruction matches a general purpose register target pointer of the second instruction, wherein when the first and second instructions do not have contiguous addresses, and wherein when the comparing step results in more than one possible pairing of first and second instructions, the youngest second instruction is paired with the oldest first instruction.

39. A processor comprising:
   an instruction queue;
   a pre-execution queue coupled to the instruction queue;
   an execution cluster coupled to the pre-execution queue;
   circuitry for determining if an operand of a first instruction depends upon a result of a second instruction, wherein the first and second instructions are included in a group of instructions transferred from the instruction queue to the pre-execution queue;
   circuitry for pairing the first and second instructions for dispatch to the execution cluster when a general purpose register source pointer of the first instruction matches a general purpose register target pointer of the second instruction;
   circuitry for determining if an operand of the first instruction depends upon a result of a third instruction, wherein the third instruction is already located in the pre-execution queue; and
   circuitry for pairing the first instruction with the third instruction for dispatch to the execution cluster when the general purpose source pointer of the first instruction matches a general purpose register target pointer of the third instruction,
   wherein when the first and third instructions do not have contiguous addresses, and wherein when the comparing step results in more than one possible pairing of first and third instructions, the youngest third instruction is paired with the oldest first instruction.

40. A data processing system, comprising:
   a processor coupled to an input device, an output device, and a memory device by a bus system, wherein the processor further comprises:
   an instruction queue;
   a pre-execution queue coupled to the instruction queue;
   an execution cluster coupled to the pre-execution queue;
   means for determining if an operand of a first instruction depends upon a result of a second instruction; and
   means for pairing the first and second instructions for dispatch to the execution cluster, wherein the first and second instructions may or may not have contiguous addresses,
   wherein the first and second instructions are included in a group of instructions transferred from the instruction queue to the pre-execution queue,
   wherein the determining means further comprises means for comparing a general purpose register source pointer of the first instruction with a general purpose register target pointer of the second instruction,
   wherein when the first and second instructions do not have contiguous addresses, and wherein when the comparing step results in more than one possible pairing of first and second instructions, the youngest second instruction is paired with the oldest first instruction.

41. A data processing system, comprising:
   a processor coupled to an input device, an output device, and a memory device by a bus system, wherein the processor further comprises:
   an instruction queue;
   a pre-execution queue coupled to the instruction queue;
   an execution cluster coupled to the pre-execution queue;
   means for determining if an operand of a first instruction depends upon a result of a second instruction; and
   means for pairing the first and second instructions for dispatch to the execution cluster, wherein the first and second instructions may or may not have contiguous addresses,
   wherein the first instruction is being transferred from the instruction queue to the pre-execution queue and the second instruction is already located in the pre-execution queue, wherein the determining means further comprises:
means for comparing a general purpose register source pointer of the first instruction with a general purpose register target pointer of the second instruction, wherein when the first and second instructions do not have contiguous addresses, and wherein when the comparing step results in more than one possible pairing of first and second instructions, the youngest second instruction is paired with the oldest first instruction.

* * * * *